United States Patent
Motose (10) Patent No.: US 7,444,213 B2
(45) Date of Patent: Oct. 28, 2008

(54) NAVIGATION INFORMATION DISPLAY CONTROL DEVICE FOR MARINE CRAFTS

(75) Inventor: Hitoshi Motose, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 720 days.

(21) Appl. No.: 10/975,326

(22) Filed: Oct. 28, 2004

(65) Prior Publication Data

US 2005/0288833 A1 Dec. 29, 2005

(30) Foreign Application Priority Data

Jun. 28, 2004 (JP) ............................... 2004-189641

(51) Int. Cl.
*B63H 20/00* (2006.01)
*B63H 21/26* (2006.01)
*G06F 17/00* (2006.01)

(52) U.S. Cl. ............................ 701/21; 701/35; 701/36; 114/144 RE; 440/2; 440/84

(58) Field of Classification Search ................... 701/21, 701/26, 25, 211; 114/144 RE; 715/866, 715/771, 774, 835; 440/2, 84, 87
See application file for complete search history.

(56) References Cited

U.S. PATENT DOCUMENTS 5,063,381 A * 11/1991 Ito .............................. 340/984
6,273,771 B1 * 8/2001 Buckley et al. ............... 440/84
7,143,363 B1 * 11/2006 Gaynor et al. .............. 715/771

FOREIGN PATENT DOCUMENTS

JP 06-195056 7/1994

* cited by examiner

*Primary Examiner*—Tan Q Nguyen
(74) *Attorney, Agent, or Firm*—Knobbe, Martens, Olson & Bear, LLP (57) ABSTRACT

On a marine craft that may be equipped with plural outboard motors engine control nodes can be mounted on outboard motors, and a display control node, as well as the network management node can be connected to a bus constructing a network. Receiving a display transmission frame sent out by the engine control nodes, display control node distinguishes the number of engines mounted, determines display layout compatible with the number of engines, and displays navigation information such as engine operational information, and navigation data including boat speed and others on a navigation information display meter in accordance with the determined display layout.

12 Claims, 6 Drawing Sheets

NAVIGATION INFORMATION DISPLAY CONTROL DEVICE FOR MARINE CRAFTS

The present application is based on and claims priority under 35 U.S.C. § 119 to Japanese Patent Application No. 2004-189641, filed on Jun. 28, 2004, the entire contents of which are expressly incorporated by reference herein.

BACKGROUND OF THE INVENTIONS

1. Field of the Inventions

The present inventions relate to display devices for marine vehicles, and more particularly, to navigation information displays for marine navigation

2. Description of the Related Art

In marine vehicles such as a motor boat having outboard motor, the engine speed and boat speed display provided at the steering wheel need to be altered depending on the type of engine within the outboard motor. That is, one speed meter displaying the engine speed is sufficient for a single installed outboard motor, but when two or more outboard motors are mounted, plural speed meters need to be installed. Therefore, the number of speed meters or gauges must be altered depending on the number of outboard motors mounted.

In addition, a boat speed meter displaying the boat speed, fuel consumption meter displaying the outboard motor fuel level, and other meters must be provided in addition to the speed meter, resulting in the requirement to alter the number of meters provided to comply with the number of devices including outboard motors mounted on the hull. Additionally, a designer or boat builder may have to alter the layout of the dashboard panel at the steering wheel so as to accommodate more gauges. Such modifications are troublesome and can be costly.

In order to eliminate such problems, a display device for mounting on a movable body has been suggested, which displays the broadcast images, navigation map, operational information, audio-visual equipment operation information, vehicle information related to speed and fuel, views from the monitoring camera to look around the vehicle, selectively and simultaneously on the screen depending on the user's operation (See Japanese Patent Publication No. Hei 6-195056).

SUMMARY OF THE INVENTION

The display device described in Japanese Patent Publication No. Hei 6-195056 can show more than two kinds of information simultaneously on single display device. However, such devices present an open issue for marine vehicles because outboard motors are generally not designed to fit a single craft. Rather, outboard motors are selected after the craft is completed. One can mount as many outboard motors as practicable within the lawful range, and when the different kinds of information are to be displayed depending on the number of outboard motors selected, the display device described in Japanese Patent Publication No. Hei 6-195056 cannot achieve optimal navigation information display compatible with every outboard motor.

In accordance with one embodiment, a navigation information display control device for marine crafts comprises a navigation information display device configured to display navigation information in a display layout of display area according to a plurality of navigation data. A navigation information collecting device is configured to collect the navigation data to be displayed. A display information control device is configured to determine the display layout on the navigation information display device based on the navigation data collected by the navigation information collecting device and to display the navigation data on the determined display layout.

In accordance with another embodiment, a navigation information display control device for marine crafts comprises a navigation information display means for displaying navigation information in a display layout of a display area. The display control device can also include a navigation information collecting means for collecting the navigation information to be displayed. Display information control means are provided for determining the display layout on the navigation information display means based on the navigation information collected by the navigation information collecting means and displaying the relevant navigation information on the determined display layout.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following Figures:

FIGS. 2(a), (b), and (c) are a schematic views of transmission frames or a "packets" that can be transmitted across the network.

FIGS. 6(a) and (b) are illustrations of examples of display screens of a navigation information display meter.

DETAILED DESCRIPTION OF THE PREFERRED EMBODIMENT

Figure 1:
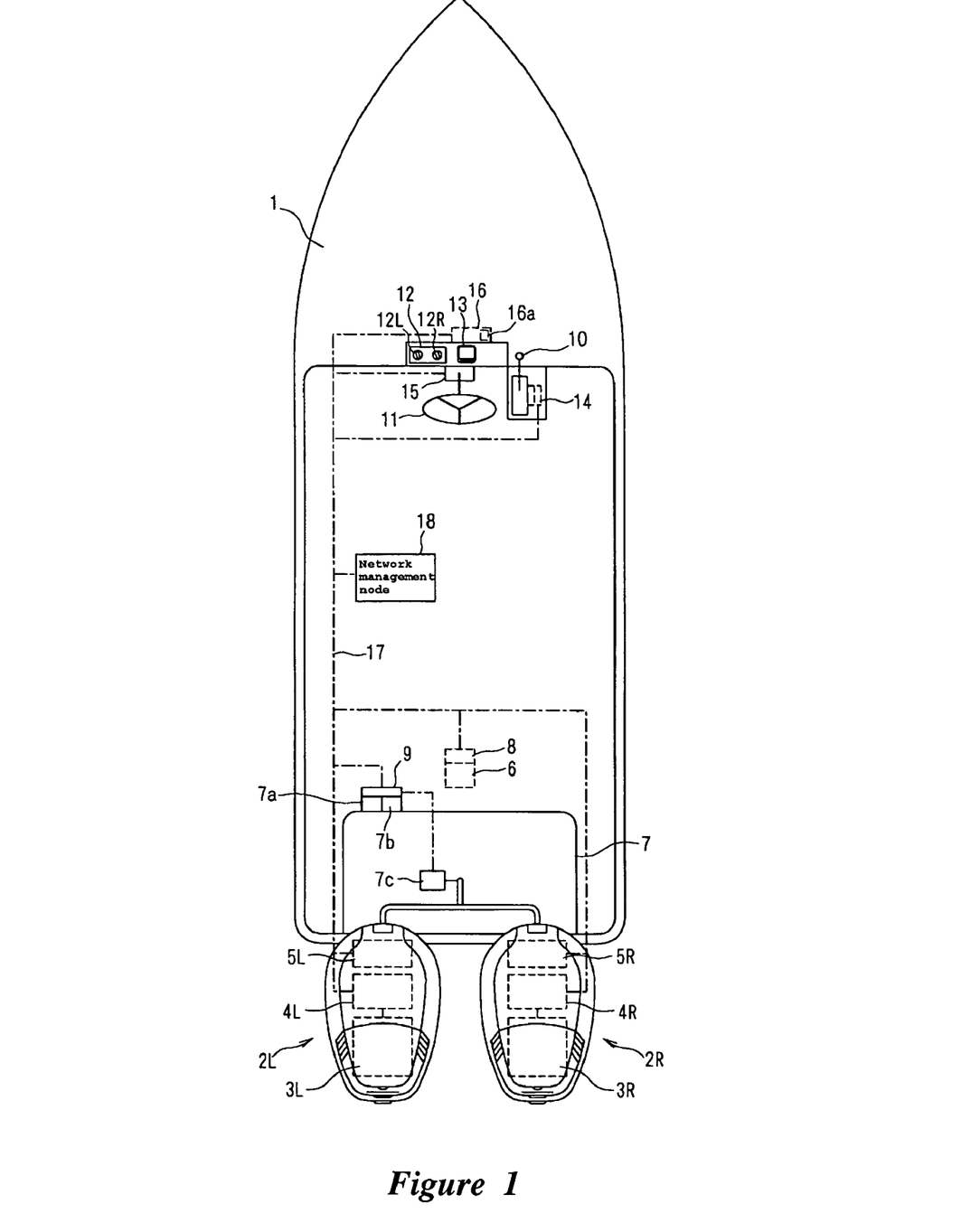
FIG. 1 is a schematic top plan view of a boat powered by an outboard-type marine propulsion system and a navigation display device connected through a digital communication network, a constructed in accordance with an embodiment.

FIG. 1 is a schematic diagram showing the first embodiment of marine engine propulsion system. The marine propulsion system is described and illustrated in the context of a power boat having a plurality of outboard motors because the inventions have particular utility in this context. However, the inventions can also be used on other vehicles, including personal watercraft, small jet boats, larger power boats, as well as land vehicles.

A reference numeral 1 in FIG. 1 denotes a hull on which transom two outboard motors 2L and 2R, for instance, are mounted. These outboard motors 2L and 2R are provided with engine control nodes 4L and 4R having the function of electronic control units for electronically controlling engines 3L and 3R that are included in the outboard motors 2L, 2R, as well as shift control nodes 5L and 5R to control the switching between forward and reverse, and optionally, neutral.

A boat speed sensor 6 can be disposed at the bottom of the hull 1 toward the transom. A fuel tank 7 can be disposed inside the hull 1 at the transom, which is provided with a fuel meter 7a for measuring at least the fuel level in the tank, and a water sensor 7b for detecting the amount of water mixed in the fuel.

The fuel in the fuel tank 7 is supplied to fuel injectors on engines 3L and 3R on outboard motors 2L and 2R via fuel conduits which can be provided with a fuel flow meter 7c Boat speed data detected by the boat speed sensor 6 is transmitted via a boat speed node 8, and fuel data detected by the fuel meter 7a, water content data detected by the water sensor 7b, and fuel flow rate data detected by the fuel flow meter 7c are transmitted via a fuel node 9.

A remote control lever 10 for giving instructions on throttle opening and shift switching to each of the outboard motors 2L and 2R is disposed toward the bow of the hull 1. A steering wheel 11, a key switch unit 12 as an engine starting operation means having key switches 12L and 12R for starting the engines 3L and 3R of the left and the right outboard motors 2L and 2R, and a navigation information display meter 13 having a liquid crystal display, for example, are disposed ahead of the remote control lever 10 on the left. Remote control lever 10 is provided with a remote control node 14 for transmitting throttle opening instruction data and shifting instruction data. Steering system 11 is also provided with a steering node 15 for transmitting steering angle data, and similarly, the navigation information display meter 13 is provided with a display control node 16 for controlling display information.

The engine control nodes 4L and 4R, the shift control nodes 5L and 5R, the boat speed node 8, the fuel node 9, the remote control node 14, the steering node 15, and the display control node 16 are connected to a bus 17 serving as a transmission channel constructing a Controller Area Network (CAN); a well-known type of local area network commonly applied to automotive applications. A network management node 18 is connected to the bus 17, serving as a network management means for managing physical address of each node 4L, 4R, 5L, 5R, 8, 9, and 14 through 16.

Here, type ID is given to allow identification and discrimination of each node type, and at the same time, part number, serial number, and manufacturer number are given to each node 4L, 4R, 5L, 5R, 8, 9, and 14 through 16. These IDs and numbers can be stored in a built-in memory. The bus 17 can be made of a twist pair cable or other material, and multiplex data transmission can be carried out using, for example, but without limitation, CSMA/CD (Carrier Sense Multiple Access/Collision Detection) transmission method.

The network management node 18, at the time of network start-up, sequentially receives physical ID request frame shown in FIG. 2(a) sent by each node 4L, 4R, 5L, 5R, 8, 9, and 14 through 16, and allocates physical node ID in accordance with the physical ID request frame. Then, the network management node 18 inserts the allocated physical node ID into the physical node ID instruction frame shown in FIG. 2(b) to send them to node 4L, 4R, 5L, 5R, 8, 9, and 14 through 16. From this time onward, the network management node 18 performs data transmission between each node using the physical node ID.

As shown in FIG. 2(a), a physical ID request frame can be composed of a 29-bit identification field F1, for instance, and an 8-byte data field F2, however, other configurations can also be used. The identification field F1 is composed of a 3-bit priority setting area A11, a 2-bit reserved area A12, an 8-bit function group number setting area A13 showing the functional grouping, an 8-bit communication item number setting area A14 showing the grouping of specific communication item, a 3-bit page number setting area A15 indicating the page number for multi-packet message transmitting the given message dividedly in two or more times, and a 5-bit physical node ID code setting area A16 for setting the physical node ID code to identify the devices that were connected to the network. The data field F2 is composed of a 1-byte reservation setting area A21, a 2-byte manufacturer number storage area A22, a 2-byte part number storage area A23, and a 3-byte serial number storage area A24.

Figure 2:
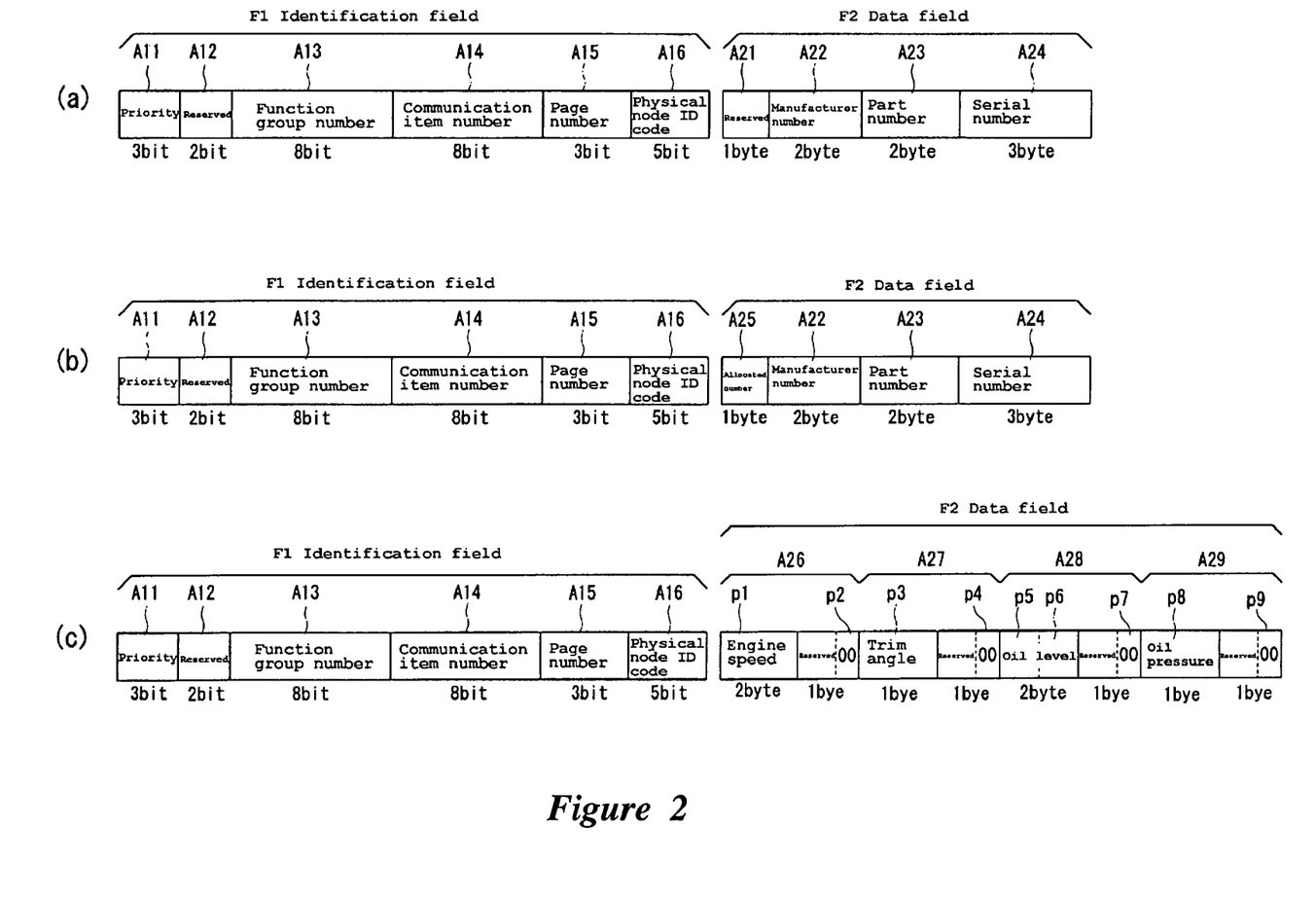

As shown in FIG. 2 (b), a physical ID instruction frame can include the identification field F1 and the data field F2 as is the case with the physical ID request frame, having similar configuration to the physical ID request frame, except that "00H" indicating the management node is set at the physical node ID code setting area A16 in the identification field F1, and that the allocated physical node ID number storage area A25 replaces the reservation setting area A21 in the data field F2.

Now, the network management node 18 can not discriminate whether the relevant outboard motor is mounted on the port side or on the starboard side when it receives physical ID request frame from the devices contained in the same function group, such as the engine control nodes 4L and 4R and the shift control nodes 5L and 5R of the outboard motors 2L and 2R. One example of a method for allowing such discrimination of the outboard motor positions is to operate the key switch 12R corresponding to the starboard side outboard motor 2R first, thus initially starting the engine control node 4R and the shift control node 5R, and then to operate the key switch 12L corresponding to the port side outboard motor 2L as the next step starting up the engine control node 4L and the shift control node 5L. In this way, the network management node 18 determines that the engine control node 4R and the shift control node 5R, for which the physical ID request frame is received first, are mounted on the starboard side, allocates the pre-determined physical node ID codes "01H" and "04H" indicating the starboard side, and inserting these ID codes as the allocated number, transmits the physical node ID instruction frame. Thus, the engine control node 4R and the shift control node 5R are acknowledged that they are on the starboard side.

Next, as the network management node 18 receives physical ID request frame from the engine control node 4L and the shift control node 5L, it determines that they are mounted on the port side, allocates the pre-determined physical node ID codes "02H" and "05H" indicating the port side, inserts these ID codes as the allocated number, and transmits the physical node ID instruction frame. Thus, the engine control node 4L and the shift control node 5L are now identified as being on the port side.

Figure 3:
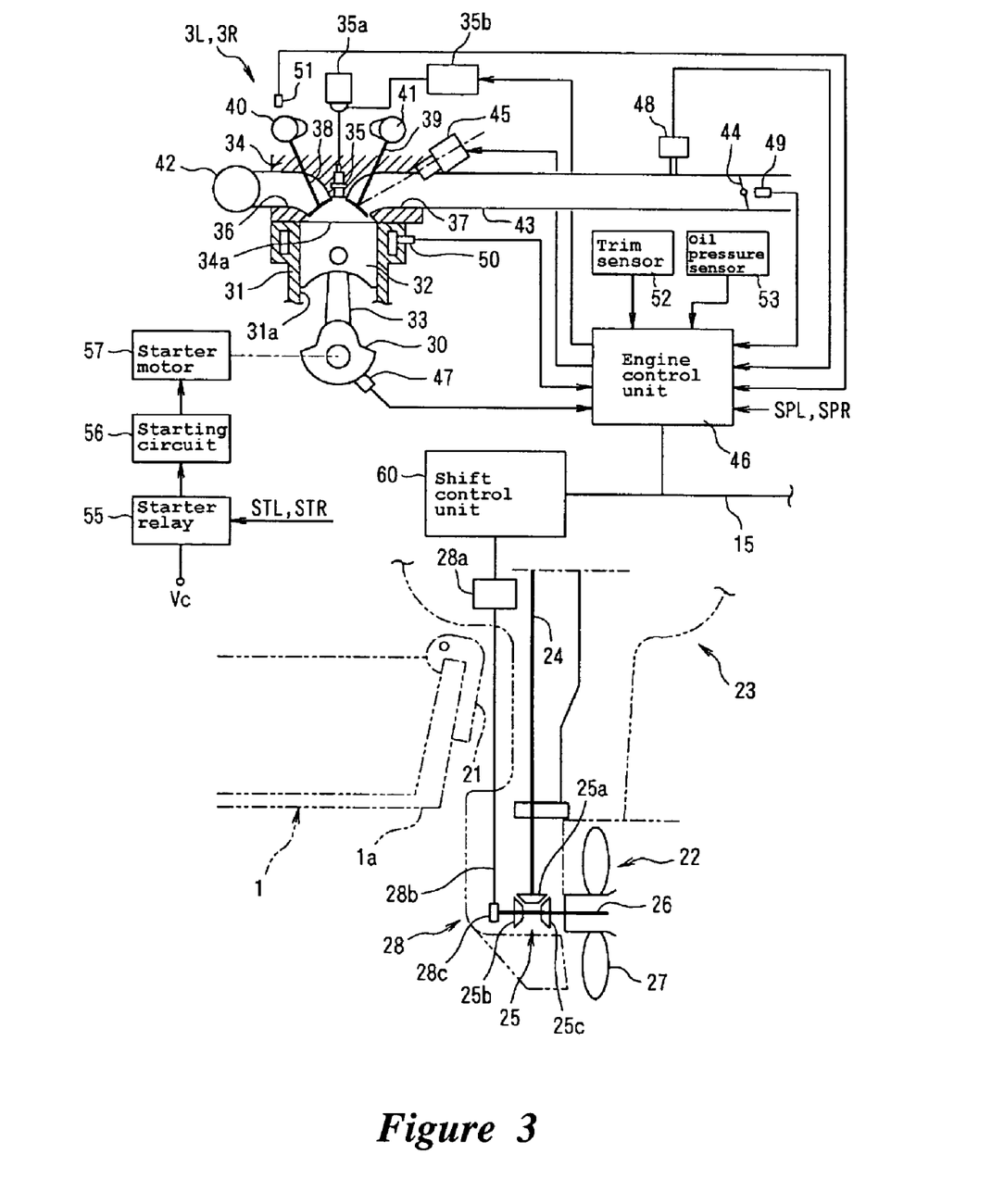
FIG. 3 is a schematic diagram and a partial sectional view of an outboard motor equipped with a four-stroke engine.

As shown in FIG. 3, each of the outboard motors 2L and 2R is supported in the vertically and horizontally swingable manner to a transom 1a of the hull 1 via a clamp bracket 21. The outboard motors 2L and 2R include the engines 3L and 3R mounted on a lower case 23 at which a propulsion unit 22 is disposed. The propulsion unit 22 can include a propulsion shaft 26 connected at the lower end of a vertically extending drive shaft 24 via a bevel gear mechanism 25, and a propeller 27 connected to the rear end of the propulsion shaft 26.

The bevel gear mechanism 25 includes a driving bevel gear 25a attached to the drive shaft 24, and a forward bevel gear 25b and a reverse bevel gear 25c rotatably mounted to the propulsion shaft 26 and engaged to the driving bevel gear 25a.

A forward-reverse shifting system 28 can be disposed on the propulsion unit 22. The forward-reverse shifting system 28 can have a vertically extending shift rod 28b. A dog clutch 28c can be connected to the shift rod 28b and can be driven rotationally by an electric motor 28a. As such, the dog clutch 28c can be configured to control the switching to either forward condition or reverse condition by coupling either the forward bevel gear 25b or the reverse bevel gear 25c to the propulsion shaft 26, or otherwise to neutral condition by not coupling either gears to the propulsion shaft 26.

As shown in FIG. 3, the engines 3L and 3R are water-cooled 4 cylinder four-stroke engines constructed with vertically positioned crankshaft 30 that is kept generally perpendicular to a surface of the water while underway. The upper end of the drive shaft 24 is coupled to the lower end of the crankshaft 30. The engines 3L and 3R have a construction in which a piston 32 is disposed slidably in a cylinder 31a formed in a cylinder block 31, with the piston 32 being joined to a connecting rod 33 and onto the crankshaft 30.

A cylinder head 34 is tightened on the rear side of the cylinder block 31 as viewed along the hull's longitudinal direction. A spark plug 35 is mounted in a combustion chamber 34a formed by the cylinder 31a and the cylinder head 34. An exhaust valve 38 and an intake valve 39 are disposed respectively at an exhaust port 36 and at an intake port 37 that are communicating with the combustion chamber 34a of each cylinder 31a. The valves 38, 39 at each cylinder 31a are driven by cam shafts 40 and 41 disposed in parallel with the crank shaft 30 to open and close the valves 38, 39. In addition, a reference numeral 35a denotes an ignition coil, and 35b denotes an ignitor.

An exhaust manifold 42 is connected to the exhaust port 36. Exhaust gas, after passing through the exhaust manifold 42 and lowercase 23, is discharged from the rear end of the propulsion unit 22.

Further, an intake pipe 43 is connected to the intake port 37 of each cylinder, and an electronically controlled throttle valve 44 is disposed within the intake pipe 43. In addition, a fuel injector 45 is disposed at the position facing the intake port 37 of each cylinder head 34. An injection orifice of the fuel injector 45 faces toward the opening of the intake port 37.

Engines 3L and 3R each have an engine control unit 46 comprised of a microcomputer and can include the engine control nodes 4L and 4R The engine control units 46 can serve as an engine control means. The engine control unit 46 receives input of the detected values directly from an engine speed sensor 47 for detecting the rotational speed of the crank shaft 30, an intake pressure sensor 48, a throttle opening sensor 49, and engine temperature sensor 50, a cylinder discrimination sensor 51, a trim sensor 52 for detecting trim angle, and an oil pressure sensor 53 for detecting the lubricating oil pressure. The engine control unit 46 can receive input, via the bus 17, corresponding to the detected values of the boat speed sensor 6 and the throttle opening instruction values selected by the remote control lever 10, and further receives directly the input of power supply signals PWL and PWR, as well as stop signals SPL and SPR from the key switch unit 12 as described later.

When start signals STL and STR from the key switch unit 12 is provided to a starter relay 55 and a starter motor 57 is brought into the operating condition by a starting circuit 56, the engine control unit 46 starts the engines 3L and 3R. After the engine start, the engine control unit 46 performs engine speed control in accordance with the throttle opening instruction values, both of which is accomplished by controlling the fuel injection amount and the injection timing of the fuel injection valve 45, as well as the ignition timing of the spark plug 35, based on the engine speed detected by the engine speed sensor 47 and the rest of the detected values, and in accordance with pre-stored operation control map.

In addition, each of the engine control nodes 4L and 4R creates a display transmission frame for transmitting display data at the given interval or "refresh rate" (every 20 msec. for instance), and sends them to the bus 17. As shown in FIG. 2(c), the display transmission frame can include an identification field F1 and a data field F2.

The identification field F1 has configuration similar to the above-mentioned physical ID request frame. On the other hand, the data field F2 includes an engine speed area A26 having a 16-bit engine speed part p1 for the engine speed data, and a 8-bit controlled engine number part p2 for the engine numbers to be controlled. The upper 6 bit are always set to "0" for reservation, and the lower 2 bit are set to "00" for the port side engine, "01" for the starboard side engine, and "10" for the center engine. The data field F2 can also include a trim angle area A27 having an 8-bit trim angle part p3 for trim angles, and controlled engine number part p4 in which the upper 6 bits are always set to "0" for reservation, and the lower 2 bits are used to for the controlled engine number. The data field F2 can also include an oil level information area A28 having an uppermost 4-bit notification information part p5 in which "normal", "caution", "warming", and "reservation" are set in each bit from the upper end, followed by a lower 4-bit overheat information part p6 in which overheat and reservation are set. The data field F2 can also include an engine number part p7 in which the upper 6 bits are always set to "0" for reservation, and the lower 2 bits are used for the controlled engine number.

The data field F2 can also include an oil pressure information area A29 having an 8-bit oil pressure information part p8 for the lubricating oil pressure, and an engine number part p9 in which the upper 6 bits are always set to "0" for reservation, and the lower 2 bits are used for the controlled engine number.

Meanwhile, the electric motor 28a of the forward-reverse shifting system 28 is rotationally driven by a shift control unit 60 which can comprise a built-in microcomputer in the shift control nodes 5L and 5R. As any one of the forward position, reverse position, and neutral position is selected with a remote control lever 8, a corresponding shift position detecting data is transmitted to the shift control unit 60 via the bus 17. The shift control unit 60, in response, activates the dog clutch 28c by turning the shift rod 28b. When the shift position detecting data indicates the forward position, the dog clutch 28c turns the shift rod 28b to make the forward bevel gear 25b engaged with the driving bevel gear 25a. On the other hand, when the shift position detecting data indicates the reverse position, the dog clutch 28c turns the shift rod 28b to make the reverse bevel gear 25c engaged with the driving bevel gear 25a. Finally, when the shift position detecting data indicates the neutral position, the dog clutch 28c turns the shift rod 28b to make both the forward bevel gear 25b and the reverse bevel gear 25c disengage from the driving bevel gear 25a.

Figure 4:
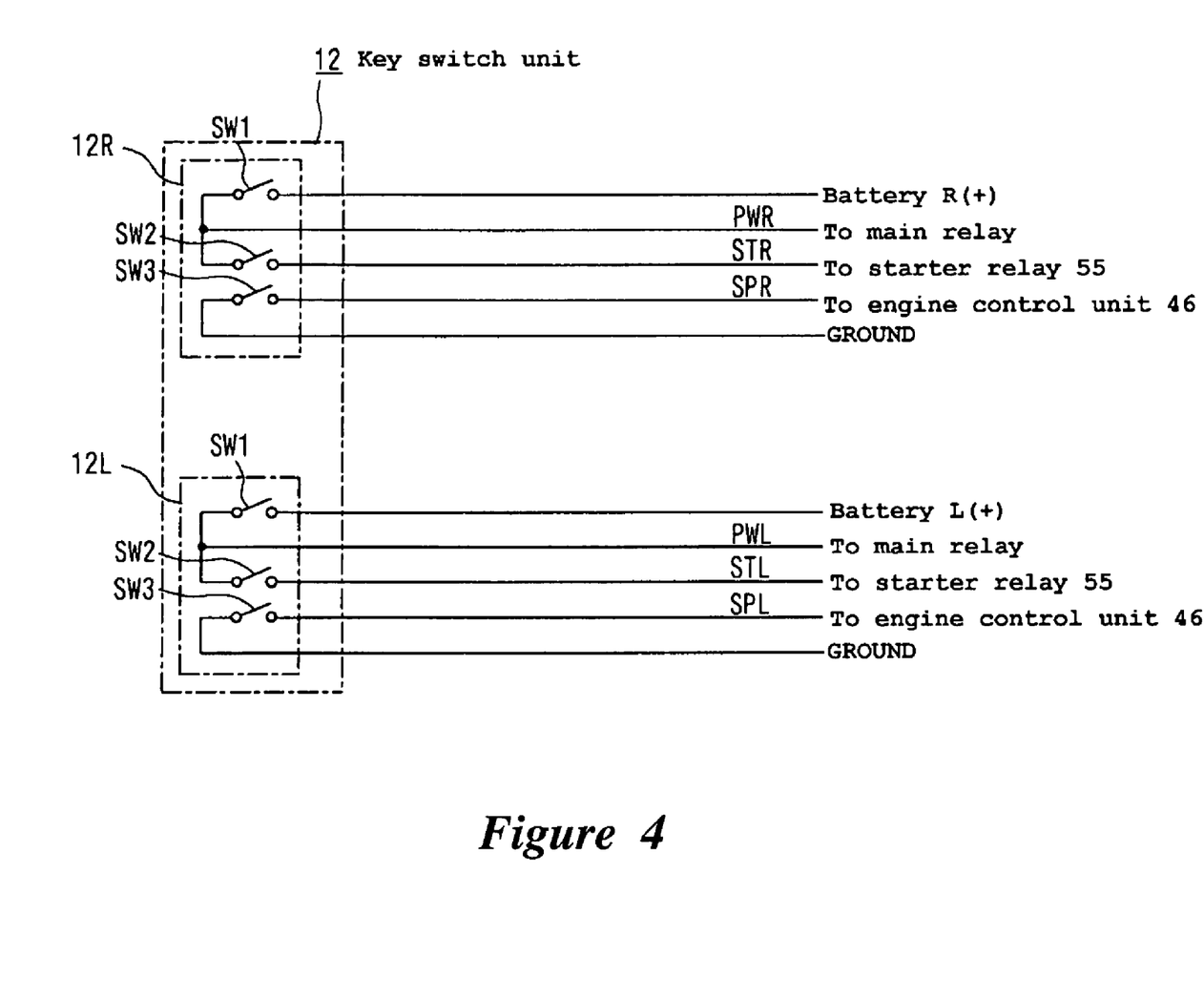
FIG. 4 is a circuit diagram showing an example of a key switch unit that can be used with the outboard motor of FIG. 3.

Further, as shown in FIG. 4, the key switch unit 12 is provided with a pair of existing key switches 12L and 12R having power supply switches SW1, engine start switches SW2, and engine stop switches SW3 for making the starting control of the engines 3L and 3R of the outboard motors 2L and 2R separately.

Here, the key switches 12L and 12R are connected directly to the engines 3L and 3R via a wiring harness, through which the power supply signals PWL and PWR indicating that the power supply switch SW1 is turned on are supplied separately to each of the parts including the engine control nodes 4L and 4R, the shift control nodes 5L and 5R of the engines 3L and 3R, to the boat speed node 8, the remote control node 14, the steering node 15, the display control node 16, and various devices. At the same time, the starting signals STL and STR are supplied to starter relays 55 of the engines 3L and 3R separately, and the stop signals SPL and SPR indicating the ground level of the stop switches SW3 are supplied to engine control units 46 of the engines 3L and 3R separately.

The display control node 16 can include a microcomputer, for instance, and has a nonvolatile memory 16a with pre-stored display layout information in compliance with the number of outboard motors mounted. Receiving the display transmission frame containing navigation information such as engine speed, trim angle, and oil level sent by the engine control nodes 4L and 4R of the outboard motors 2L and 2R, the display control node 16 identifies the number of outboard motors installed and the engine type, determines display layout appropriate for the number of outboard motors, and executes display control process to indicate the relevant information in the determined display layout.

Figure 5:
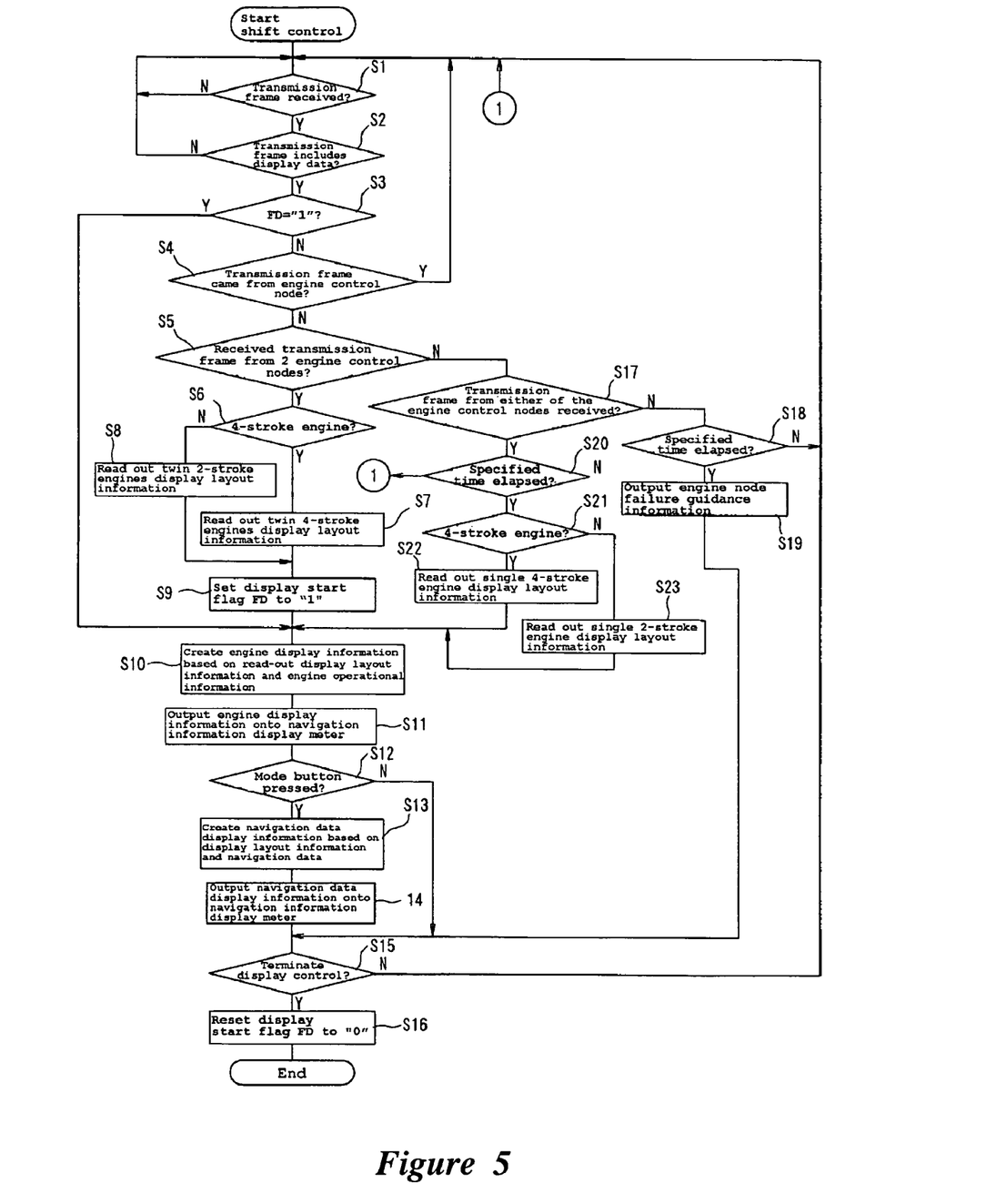
FIG. 5 is a flow chart showing an example of display control procedure that can be executed by a display control node.

The execution of a display control process can start as the power to the display control node 16 is turned on. FIG. 5 illustrates an exemplary process for display control that can be used with the propulsion system illustrated in FIGS. 1-4. In this process, the display control node 16 can first determine, in step S1, if the transmission frame has been received via the bus 17 or not. It waits until it receives the transmission frame if it has not been received, or proceeds to step S2 if it has already been received.

In step S2, the display control node 16 determines if the received transmission flame includes the display data it requires or not. It returns to step S1 if the received transmission flame does not include the data required by the node, or proceeds to step S3 if the received transmission flame includes the display data it requires.

In step S3, the display control node 16 determines if a display start flag FD (described in greater detail below) is set to "1" or not. If F="1", the process can proceed to step S10 acknowledging that the display layout has been determined and navigation information display has been initiated. IF FD="0", it proceeds to S4 acknowledging that the display layout has not been determined yet.

In step S4, the display control node 16 can determine if the transmission frame received is the display transmission frame sent by engine control node 4L or 4R, and consequently goes back to step S1 if it is not the display transmission frame, or proceeds to step S5 if it is the one.

In step S5, the display control node 16 can determine if it has received the display transmission frame from the left and the right engine control nodes 4L and 4R. If it has received the display transmission frame from both the left and the right engine control nodes 4L and 4R, it proceeds to step S6, acknowledging that the outboard motors are in twin installation.

In step S6, the display control node 16 can determine if the engines 3L and 3R of the outboard motors 2L and 2R are four-stroke or not. The determination can be made by checking if the display transmission frame contains the lubrication oil pressure information or not. If it contains the lubrication oil pressure information, the display control node 16 acknowledges that they are four-stroke engines, and proceeds to step S7 to read out the standard display layout information stored in the memory 16a for the twin installation four-stroke engines. Then, it proceeds to step S9. If it does not contain the lubrication oil pressure information, the display control node 16 acknowledges that the engines 3L, 3R are two-stroke engines, and proceeds to step S8 to read out the standard display layout information from the memory 16a for the twin installation two-stroke engines. Then, the process proceeds to step S9.

In step S9, the display control node 16 can set the display start flag FD to "1" acknowledging that the display layout has been decided and t is ready to be displayed. The process can then proceed to step S10 in which engine display information based on the display layout information it has read-in and the navigation information included in the display transmission frame can be created. The process can then proceed to step S11 to output the engine display information it has created onto the navigation information display meter. The process can then proceed to step S12.

In step S12, the display control node 16 can determine if the mode button 13c FIG. 6(a), (b)) to switch the display mode has been turned on or not. The process proceeds to step S15 directly if the mode button 13c is "off", or proceeds to step S13 if the mode button 13c has been turned "on". If the mode button 13c has been turned "on," the display control node 16 can create navigation data display information based on the detected boat speed value, fuel level, and fuel consumption stored in the data field F2 of the display transmission frame sent by the boat speed node 8 and the fuel node 9, using the display layout disposing navigation data display sections for boat speed information, fuel consumption, fuel level, and so on as shown in FIG. 6(b). The process can then proceed to step S14 to output the navigation data display information it has created onto the navigation information display meter 13, and then return to step S12.

In step S15, the display control node 16 can determine if the requirements for terminating the display control are met. For example, the display control node 16 can determine if the engines 3R, 3L are stopped. In one example, the display control node 16 can determine if the stop switches SW3 have been activated. The process can return to step S1 if the display control terminating requirements are not met, or it can proceed to step S16 to reset the display start flag FD to "0" if the display control terminating requirements are met, and then terminate the display control process.

When the determination in step S5 indicates that the display transmission frames are not received from both of the two engine control nodes 4L and 4R, the display control node 16 proceeds to step S17 to determine if either of the display transmission frames from the engine control nodes 4L and 4R has been received or not. If neither of the two display transmission frames have been received, it proceeds to step S18 to determine if the specified time has been elapsed or not, and returns to step S1 if the specified time has not been elapsed. If the specified time has elapsed, the node determines that some abnormality has occurred to the engine control node, outputs the guidance information to this effect on the navigation information display meter 13, and proceeds to step S15.

The determination in step S17 can be used as an indication that one of the display transmission frames of the two engine control nodes 4L and 4R is received. If so, the process can proceed to step S20 in which it can be determined if the specified time has been elapsed or not. The process can return to step S1 if the specified time has not been elapsed. On the other hand, if the specified time has elapsed, the process can proceed to step S21 acknowledging that the outboard motor is in single installation.

In step S21, the display control node 16 can determine if the outboard motor has a four-stroke engine or not, and proceeds to S22 if it is a four-stroke engine. In the step S22, the display control node 16 can read out from the memory 16a the display layout compatible with the single installation four-stroke engine and proceeds to step S9. If the engine is a two-stroke type, the process can proceed to S23, to read out from the memory 16a the display layout compatible with the single installation two-stroke engine and proceeds to step S9.

In the display control process shown in FIG. 5, physical node ID allocating process as well as the process in the data steps S1 through S5, and S17 correspond to navigation information collecting means. The processes in the steps S6 through S16, and in the steps S18 through S23 corresponding to display information control means. The processes pertaining to the mode button 13c as well as the process in step S12 correspond to selection means.

In operation, while the power supply switches SW1 of the key switches 12L and 12R in the key switch unit 12 are turned off, power supply switches SW1 do not output any power supply signal PWL or PWR, and a main relay is maintained in the off state. Thus, the power supply is not turned on for the engine control unit 46 or the shift control unit 60 of the engines 3L and 3R, as well as for various kinds of control devices including each node 4A, 4B, 5L, 5R, 8, 9, 14 through 16, and 18, keeping the engines 3L and 3R stopped, and keeping the network stopped.

In the stopped state described above, the power supply switches SW1 are turned on at first by operating the key switch 12R at the right, which turns on the power supply signal PWR, with the main relay controlled to move to the on state. Thus, power is supplied from the battery (not shown) to the engine control unit 46 and the shift control unit 60 of the engine 3R, and for various kinds of control devices including each node 4R, 5R, 8, 9, 14 through 16, and network management node 18.

In the course of power supply turning-on process, each of the nodes 4R, 5R, 8, 9, and 14 through 16 sends the physical ID request transmission frame to the network management node 18, which in turn allocates the physical node ID code for the network communication to each node. Additionally, the network management node 18 creates the physical ID instruction transmission frame storing the allocated physical ID code in the allocated physical node ID number storage A25 in the data field F2, and also storing the manufacturer number, part number, and serial number of the node requested the physical ID code in the manufacturer number storage A22, in the part number storage A23, and in the serial number storage A24 respectively. Then, the network management node 18 sends the physical ID instruction transmission frame to the bus 17. Receiving the physical ID instruction transmission frame addressed to itself in this way, each node creates the transmission frame storing the physical ID code in the physical ID code storage A16 in the identification field. Once such transmission frame is sent out to bus 17, data transmission and reception between each node become practicable.

At this time, the network management node 18 acknowledges that the physical ID request transmission frames it received initially from the engine control node 4R and the shift control node 5R in the process of executing physical ID code allocation are for the starboard motor, and allocates physical ID codes "01" and "04" that represents the starboard motor. Thus, receiving the physical ID instruction transmission frames in which such physical ID codes are stored, the engine control node 4R and the shift control node 5R of the starboard motor 3R store "01" that denotes the starboard motor in the controlled engine number storage parts p2, p4, p7 and p9 in the data field F2 when they send out their own transmission frame. In this way, the discrimination of the outboard motor on the starboard side is accomplished.

Consequently, as the power supply switch SW1 is turned on by operating the key switch 12L corresponding to the port side outboard motor 2L, the power supply signal PWL is turned on, making the main relay controlled to get turned on, and the power is supplied from the battery (not shown) to various control devices of the engine 3L including the engine control node 4R and the shift control node 5R.

Thus, as the engine control node 4L and the shift control node 5L send the physical ID request transmission frames to fie network management node 18 via the bus 17, the network management node 18 receiving them acknowledges that they are the port side engine information, allocates the physical ID code "02" and "05" that represents the port side engine, and creates the physical ID instruction transmission frame storing the allocated physical ID codes in the allocated physical node ID number storage area A25 in the data field F2. The network management node 18 also stores the manufacturer number, part number, and serial number of the node requested the physical ID code in the manufacturer number area A22, in the part number area A23, and in the serial number area A24 respectively, and then, sends the physical ID instruction transmission frames to the engine control node 4L and the shift control node 5L. Receiving them, the engine control node 4L and the shift control node 5L store "00" that denotes the port side motor in the controlled engine number storage parts p2, p4, p7 and p9 in the data field F2, when they create the transmission flames, thus enabling the discrimination to be the port side engine.

Once the allocation of the physical ID code is completed for each node connected to the network, each node creates the transmission flame for sending out the data in the pre-determined interval (in the range of every 10 msec. to 1 sec., for instance), and sends it out to the bus 17.

The display control node 16 resets the display start flag FD to "0" in the initialization process. In addition, even in the case that the display control node 16 receives display transmission frames from boat speed node 8 or fuel node 9 it uses while it is not receiving the display transmission frame from the engine control node 4L and/or 4R, it discriminates the receiving display transmission frames not being sent out from the engine control node 4L and/or 4R as it proceeds from step S1 to step S4 through steps S2 and S3. Consequently, the navigation information display meter 13 is kept in the non-display condition, since the display control node 16 repeats the process to return from step S4 to step S1.

To move out from the non-display condition, the starboard side engine control node 4R acquires physical ID code "01" at first, and sends out the display transmission frame as shown in FIG. 2(c). When the display control node 16 receives this transmission frame from the engine control node 4R, it proceeds from step S1 to step S2, S3, and to S4, and then, since it receives the display transmission frame for the first time, it proceeds to step S17 and to step S20, from which it repeats the process to return to step S1 since the specified time has not been elapsed.

Subsequently, when the power supply switch SW1 is turned on and the power supply signal PWL is turned on before the specified time has been elapsed, the engine control node 4L and the shift control 5L on the port side engine 3L acquires physical ID codes and starts sending out the display transmission frame. Receiving the display transmission frame from the engine control node 4L, the display control node 16 proceeds from step S5 to step S6 of the process shown in FIG. 5.

Here, it acknowledges that the both engines 4L and 4R are of four-stroke, and proceeds to step S7 to read out the display layout for the twin installation four-stroke engine from the memory 16a. Then, the display control node 16 proceeds to step S9 setting the display start flag FD to "1", and to step S10 to create the engine display information based on the display layout information it read out, together with the various data contained in the data field F2 of the display transmission frame received from the engine control node 4L and 4R.

Figure 6:
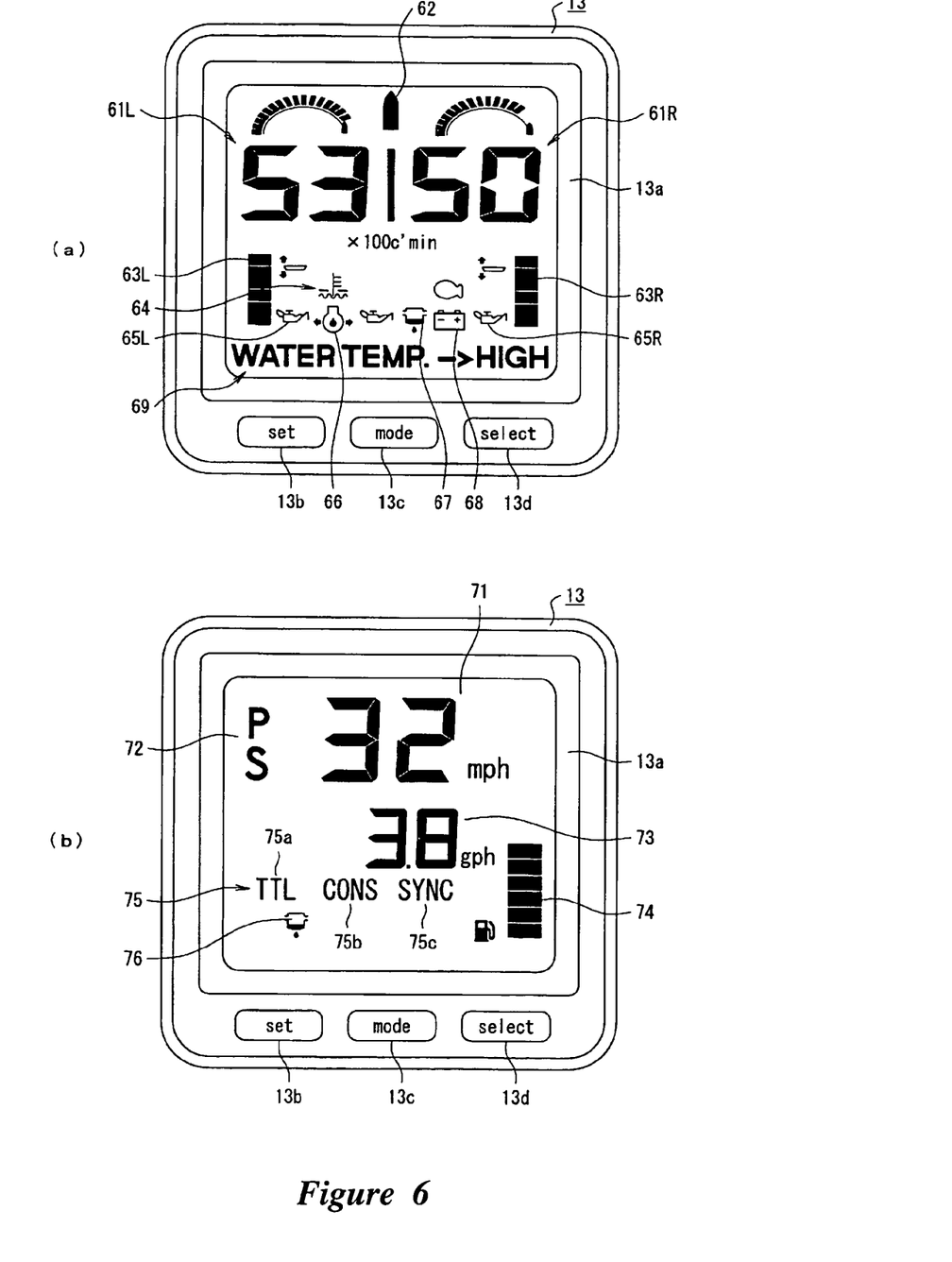

As the engine display information is output onto the navigation information display meter 13, the engine information is displayed on the navigation information display meter 13. As shown in FIG. 6, the navigation information display meter 13 has a display screen 13a composed of a color liquid crystal display, and a set button 13b to set the time etc., a mode button 13c to switch between the modes of display, as well as a select button 13d to select the contents of the display shown in the display area that are disposed below the display screen 13a. Based on the engine display information, the twin installation four-stroke engine information is displayed on the display screen 13a.

As shown in FIG. 6(a), the engine display layout for displaying the twin installation four-stroke engine information has; an engine speed display parts 61L and 61R located in the upper part of the display and divided vertically into left and right halves showing the engine speeds of the left and right engines 3L and 3R by bar charts and digital displays. Additionally, the engine display layout includes a steering direction display part 62 provided in the upper part between the engine speed display parts 61L and 61R showing the steering direction of the steering wheel 11. A trim angle display can include parts 63L and 63R disposed below the engine speed display parts 61L and 61R at left and right ends showing the trim angles in bar charts. The engine display layout can also include an overheat display part 64 showing if the engines are in overheat condition or not, an oil condition display parts 65L and 65R showing in color the low oil level and/or the insufficient oil pressure, and a failure display part 66 showing the failure of the engines.

A water content display part 67 can also be included in the engine display layout showing if any water has been mixed into the fuel in the fuel tank 7 or not and a voltage display part 68 showing the low battery voltage and/or the failure of generating equipment which are disposed between the trim angle display parts 63L and 63R A multiple display part 69 can also be disposed at the lower end of the screen showing the water temperature, the oil temperature, the oil level, or other items selectively.

As described above, the network management node 18 automatically identifies the left and the right positioning of the outboard motors 2L and 2R by operating the key switches 12L and 12R in the specified order differentiating the timing for turning on the power to the outboard motors 2L and 2R mounted on the left and the right. Further, as the management node 18 instructs the acknowledged positioning to the engine control nodes 4L and 4R, and the shift control nodes 5L and 5R of each of the outboard motors 2L and 2R by means of the allocated physical ID codes, each of the engine control nodes 4L and 4R, and each of the shift control node 5L and 5R recognize that they are either at the port side or at the starboard side, and set the left and the right identification code in the controlled engine number storage parts p2, p4, p7 and p9 created in the data field F2 of the display transmission frame.

Thus, by referring to the controlled engine number when receiving the display transmission flames from the engine control nodes 4L and 4R, the display control node 16 can automatically distinguish the port side engine from the starboard side engine, and based on this distinction, it can correctly display the engine speed, the oil condition, the overheat, and other operational information for the port and starboard engines at the left and the right part on the display screen 13a. In this way, when users purchase the outboard motors 2L and 2R and have them mounted on the hull 1, they can make the engine operational information displayed correctly in compliance with the outboard motors mounting position, simply by connecting the power supply circuit wiring properly, namely the proper connection of the power line to the key switches 12L and 12R, and by making simple wiring to connect the bus 17 to the engine control nodes 4L and 4R as well as the shift control nodes 5L and 5R of the outboard motors 2L and 2R, and other nodes 8, 9, 14 through 16, and 18.

When visual confirmation of boat speed and/or fuel consumption is desired on the current display format of the engine operational information, the mode button 13c on the navigation information display meter 13 can be actuated. Once the mode button 13c is actuated, the display control node 16 proceeds from step S12 to step S13 in the display control process in FIG. 5, to read out the navigation data display layout information stored in the memory 16a. The display control node 16 can then create the navigation data display information by incorporating in the read-out display layout information the various navigation data such as the boat speed detected value included in the display transmission frame from the boat speed node 8, the fuel consumption and fuel level data included in the display transmission frame from the fuel node 9, etc. The display control node 16 can then proceed to step S14 to output the navigation data display information it created onto the navigation information display meter 13, providing the navigation information display as shown in FIG. 6(b) on the display screen 13a of the navigation information display meter 13.

The navigation information display can comprise a boat speed display part 71 disposed in the upper center for the digital display of the boat speed detected value (in miles per hour), an engine position display part 72 disposed to the left of the boat speed display part 71 for displaying the engine position by P (port side) or S (starboard side), a fuel consumption display part 73 positioned below the boat speed display part 71 for the digital display of the fuel consumption (in gallons per hour), a fuel level display part 74 disposed at the lower right of the fuel consumption display part 73 for displaying the current fuel level by a bar chart, a mode display part 75 disposed blow the fuel consumption display part 73 for displaying data in the specified mode, and a water content display part 76 disposed below the mode display part 75 for displaying the presence of water in the fuel.

The mode display part 75 can include a mode display 75a which displays "TTL", a mode display 75b which displays "CONS" and a mode display 75c which displays "SYNC". When a user activates the select button 13d (e.g., presses the button 13d) to place the display device 13 in the TTL mode, the device 13 displays the navigation distance display part showing the digital display of the distance underway, and the total fuel consumption display part showing the digital display of the total amount of fuel used, replacing the boat speed display part 71 and the fuel consumption display part 73. When the CONS mode is selected, the screen contains the boat speed display part 71 and the fuel consumption display part 73, replacing the same as above. Finally, when in the SYNC mode, the screen contains the synchronization level display part showing the engine speed synchronization level for twin installation, replacing the boat speed display area 71.

That is, the navigation distance and the total amount of fuel consumed are displayed by pressing the select button 13d when the boat speed and the fuel consumption are displayed as shown in FIG. 6(b), the engine speed synchronization level for twin installation is displayed by pressing the select button 13d again, and the screen returns to display the boat speed and the fuel consumption as shown in FIG. 6(b) when the select button 13d is pressed once more.

The navigation data display mode is turned off by pressing the mode button 13c, and the screen returns to the engine information display mode as shown in FIG. 6(a).

Further, if one of the outboard motors 2L and 2R is eliminated, i.e. the outboard motor 2R is eliminated, for instance, and the outboard motor 2L alone is mounted in the center of the transom, only one key switch 12L is provided on the key switch unit 12. Once the key switch 12L is turned on, the power is supplied from the battery to the engine control node 4L, the shift control node 5L, the boat speed node 8, the fuel node 9, the remote control node 14, the steering node 15, the display control node 16, the network management node 18, and each of the devices installed.

In this case, the physical ID request transmission flame from the engine control node 4L alone is sent to the network management node 18, which in turn allocates the physical ID code "00" that denotes the starboard side engine. As the physical ID code "00", stored in the allocated physical node ID number storage area A25 in the data field F2 of the physical ID instruction transmission frame is sent to the engine control node 4L, the display transmission frame sent out by the engine control node 4L has "00" stored in its controlled engine number storage parts p2, p4, p7, and p9 denoting that it is the starboard side engine.

However, the display control node 16 proceeds to step S17 in the FIG. 5 process when it receives the display transmission frame from the engine control node 4L, and then proceeds to step S20 to determine whether the specified time has elapsed or not. It keeps going back to step S1 if the specified time has not been elapsed, but in the case the engine control node 2R does not exist, the specified time will be elapsed since no display transmission frame will be received from any other engine control node. Then, it proceeds from step S20 to step S21, and proceeds further to step S22, as it is a four-stroke engine, to read out the display layout information from the memory 16a for displaying the engine information of the single 4-stroke engine. Here, the display control node 16 creates the engine display information for single installation based on the read-out layout together with the engine operational information such as the engine speed, the trim angle, the oil information, and other information stored in the data field of the display transmission frame sent out by the engine control node 4L. After that, it proceeds to step S9 to set the display start flag FD to "1", and proceeds to step S10 to output the engine display information into the navigation information display meter 13, showing the engine operational information on the navigation information display meter 13.

In this case, too, the display is switched to the navigation display mode by pressing the mode button 13c, and returns to the engine information display mode by pressing the mode button 13c again.

Further, when two-stroke engines are mounted at the outboard motors 2L and 2R, display layout information compatible with the twin or single installation of the two-stroke engine is stored to deal with the case. The two-stroke display transmission frame layout is similar to the display transmission frame of the four-stroke engine except that the oil pressure storage area A29 contained in the data field F2 of the display transmission frame is replaced with the lubricating oil level storage area to store the lubricating oil level data detected by the lubricating oil level sensor, and the lubricating oil level display part is provided in the memory 16a of the display control node 16.

Once the two-stroke engine is acknowledged in step S6 or step S21 of the FIG. 5, the display control node 16 proceeds to step S8 or step S23, reads out the display layout information for twin or single installation two-stroke engine referring to the memory 16a, creates the engine operational display information based on the read-out display layout information and the engine operational information stored in the data field of the display transmission frame sent out by the engine control node. The display control node 16 then outputs the created engine operational display information onto the navigation information display meter 13, showing automatically the engine operational information compatible with the two-stroke engine.

Thus, according to the embodiment described above, the optimal display layout is selected automatically in accordance with the number of outboard motors mounted on the hull 1, and the engine information, navigation data, and other data are correctly displayed on the navigation information display meter 13.

In this approach, no provision of dip switch or other mechanism is required on the navigation information display meter 13 to comply with the number of outboard motors mounted, eliminating the problems such as the wrong display due to the improper setting of the dip switches, the cost increment to assure water tightness at the dip switch area, the requirements for the operation manual of the dip switch, or incompatibility between the old and the new versions when some new display is introduced. As such, the engine operational information and navigation data can be displayed quite easily by just having the display control node connected to the network.

It should be noted that this invention is not limited to the twin installation, although the above-mentioned embodiment covers the case of twin installation. It may be applied to the multiple installation in which three or more outboard motors are mounted. In such case, too, the sequence to supply power to each outboard motor engine is established in advance, so that the network management node 18 acknowledges the mounting position of the outboard motors and allocates the relevant physical ID code, allowing the engine control node on each outboard motor to acknowledge its own mounting position. As each engine control node sends out the display transmission frame with the controlled engine number stored in its data field F2, the display control node 16 establishes the display layout according to the number of display transmission frames received from the engine control node, creates the engine display information and the navigation data display information based on the established display layout and the data contained in the display transmission frame, and selectively outputs these information onto the navigation information display meter 13 to display the engine operational information and the navigation data. When a large number of outboard motors are installed, it is recommended to provide a larger liquid crystal display screen to assure the appropriate display area, or to divide the display into multiple navigation information display meter.

Again, it should be noted that this invention is not limited to the engine types of two-stroke and four-stroke, although the above-mentioned embodiment covers the case of these engine types. It is practicable to carry out the engine information display for various engine types by storing the engine operational information corresponding to other engine configurations such as a fuel injection engine and a direct injection engine, in the data field F2 of the display transmission frame, and by sending such display transmission flame to the display control node 16. Storing the display layout in compliance with such engine types in the memory 16a of the display control node 16, it enables the engine information display compatible with various types of engines.

Further, the above-mentioned embodiment covered the case in which the engine speed data, the trim angle data, the oil level data and the oil pressure data are all contained in the display transmission frame sent out by the engine control nodes 4L and 4R, however, this invention is not limited to such configuration. The separate display transmission frames may be created for transmitting each data, or the display transmission frame may be configured to transmit any combination of multiple data at a time.

Still further, the above-mentioned embodiment covers the case in which color liquid crystal display device is applied as the display screen of the navigation information display meter 13, however, this invention is not limited to such device. Other types of display device such as CRT display, and organic electroluminescent display may be applied.

Still further, the above-mentioned embodiment covers the case in which the outboard motor mounting position is determined by establishing the sequence to turn on the key switches, however, this invention is not limited to such case. The mounting position may be established by making an access to the engine control node of an outboard motor at the time of installation to set up its mounting position in the non-volatile memory, or by using some other set-up means such as a dip switch provided on the engine control node.

In addition, the above-mentioned embodiment covers the case in which the engine control node and the shift control node are provided separately, however, this invention is not limited to such structure. The engine control node and the shift control node may be combined into one control node.

Further, the above-mentioned embodiment covers the case in which the network is constructed with CAN, however, this invention is not limited to such construction. A network utilizing the time trigger protocol, or other network protocols may be used. Otherwise, a wireless LAN may be applied instead of the wired LAN.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above, but should be determined only by a fair reading of the claims that follow.

What is claimed is:

1. A navigation information display control device for marine crafts, comprising a navigation information display device configured to display navigation information in a display layout of display area according to a plurality of navigation data, a navigation information collecting device configured to collect the navigation data to be displayed, and a display information control device configured to determine the display layout on the navigation information display device based on the navigation data collected by the navigation information collecting device and to display the navigation data on the determined display layout, wherein the navigation information collecting device is configured to connect to each device mounted on the marine craft over a network and to collect device information at the time of initial start up of the network, and wherein the display control device is configured to determine the display layout based on the device information collected by the navigation information collecting device.

2. The navigation information display control device for marine crafts according to claim 1, wherein the navigation information collecting device is configured to distinguish the mounting position of the outboard motors by a pre-determined sequence for turning on the power to the outboard motors when plural motors are connected to the network, and the display information control device is configured to establish the display layout according to the distinguished mounting position of the outboard motors.

3. The navigation information display control device for marine crafts according to claim 2, wherein the display modes include an outboard motor condition display mode showing outboard motor information including at least one of outboard motor engine speed, trim angle, and device condition warning indication, and a navigation status display mode showing information for navigation including at least one of boat speed information and fuel consumption information.

4. The navigation information display control device for marine crafts according to claim 1, wherein the display information control device has plural display modes configured to display different data, and to allow selection of the display modes by a selecting device.

5. A navigation information display control device for marine crafts, comprising a navigation information display device configured to display navigation information in a display layout of display area according to a plurality of navigation data, a navigation information collecting device configured to collect the navigation data to be displayed, and a display information control device configured to determine the display layout on the navigation information display device based on the navigation data collected by the navigation information collecting device and to display the navigation data on the determined display layout, wherein the navigation information collecting device is configured to distinguish the mounting position of the outboard motors by a pre-determined sequence for turning on the power to the outboard motors when plural motors are connected to the network, and the display information control device is configured to establish the display layout according to the distinguished mounting position of the outboard motors.

6. The navigation information display control device for marine crafts according to claim 5, wherein the display information control device has plural display modes configured to display different data, and to allow selection of the display modes by a selecting device.

7. A navigation information display control device for marine crafts, comprising a navigation information display means for displaying navigation information in a display layout of a display area, a navigation information collecting means for collecting the navigation information to be displayed, and a display information control means for determining the display layout on the navigation information display means based on the navigation information collected by the navigation information collecting means and displaying the relevant navigation information on the determined display layout, wherein the navigation information collecting means includes means for connecting each device mounted on the marine craft with a network and for collecting the specified device information at the time of initial start up of the relevant network to comply with the types of devices, and wherein the dislay control means includes means for determining the display layout based on the device information collected by the navigation information collecting means.

8. The navigation information display control device for marine crafts according to claim 7, wherein the navigation information collecting means includes means for distinguishing the mounting position of the outboard motors by a pre-determined sequence for turning on the power to the outboard motors when plural motors are connected to the display means, and wherein the display information control means includes means for establishing the display layout in compliance with the distinguished mounting position of the outboard motors.

9. The navigation information display control device for marine crafts according to claim 7, wherein the display information control means has plural display modes containing different kinds of display information, and includes means for allowing selection of the display modes.

10. The navigation information display control device for marine crafts according to claim 9, wherein the display modes include an outboard motor condition display mode showing outboard motor information including at least one of outboard motor engine speed, trim angle, and device condition warning indication, and a navigation status display mode showing information including at least one of boat speed information and fuel consumption.

11. A navigation information display control device for marine crafts, comprising a navigation information display means for displaying navigation information in a display layout of a display area a navigation information collecting means for collecting the navigation information to be displayed, and a display information control means for determining the display layout on the navigation information display means based on the navigation information collected by the navigation information collecting means and displaying the relevant navigation information on the determined display layout, wherein the navigation information collecting means includes means for distinguishing the mounting position of the outboard motors by a pre-determined sequence for turning on the power to the outboard motors when plural motors are connected to the display means, and wherein the display information control means includes means for establishing the display layout in compliance with the distinguished mounting position of the outboard motors.

12. The navigation information display control device for marine crafts according to claim 11, wherein the display information control means has plural display modes containing different kinds of display information, and includes means for allowing selection of the display modes.

* * * * *

UNITED STATES PATENT AND TRADEMARK OFFICE
CERTIFICATE OF CORRECTION

PATENT NO.       : 7,444,213 B2                                   Page 1 of 1
APPLICATION NO.  : 10/975326
DATED            : October 28, 2008
INVENTOR(S)      : Hitoshi Motose It is certified that error appears in the above-identified patent and that said Letters Patent is hereby corrected as shown below:

At column 1, line 14, change "navigation" to --navigation.--.

At column 3, line 1, change "7cBoat" to --7c. Boat--.

At column 5, line 35 (Approx.), change "4R" to --4R.--.

At column 6, line 16, change ""warming"," to --"warning",--.

At column 7, line 21, change "flame" to --frame--.

At column 7, line 23, change "flame" to --frame--.

At column 7, line 24, change "flame" to --frame--.

At column 7, line 28, change "F="1"," to --FD="1",--.

At column 8, line 5, change "FIG." to --(FIG.--.

At column 9, line 65, change "fie" to --the--.

At column 10, line 15, change "flames," to --frames,--.

At column 10, line 19, change "flame" to --frame--.

At column 11, line 27, change "not" to --not,--.

At column 11, line 29, change "equipment" to --equipment,--.

At column 11, line 50, change "flames" to --frames--.

At column 13, line 6, change "flame" to --frame--.

At column 14, line 55 (Approx.), change "flame" to --frame--.

At column 16, line 65, in Claim 7, change "dislay" to --display--.

At column 18, line 4, in Claim 11, change "area" to --area,--.

Signed and Sealed this

Thirtieth Day of March, 2010

David J. Kappos
*Director of the United States Patent and Trademark Office*